(12) United States Patent
Byers (10) Patent No.: US 9,350,448 B2
(45) Date of Patent: May 24, 2016

(54) MULTI-BEAM FREE SPACE OPTICAL ENDPOINT

(71) Applicant: Cisco Technology Inc., San Jose, CA (US)

(72) Inventor: Charles Calvin Byers, Chicago, IL (US)

(73) Assignee: Cisco Technology, Inc., San Jose, CA (US)

( * ) Notice: Subject to any disclaimer, the term of this patent is extended or adjusted under 35 U.S.C. 154(b) by 99 days.

(21) Appl. No.: 14/095,247

(22) Filed: Dec. 3, 2013

(65) Prior Publication Data

US 2015/0156568 A1 Jun. 4, 2015

(51) Int. Cl.
*H04B 10/112* (2013.01)
*H04B 10/114* (2013.01)

(52) U.S. Cl.
CPC ........ *H04B 10/1125* (2013.01); *H04B 10/1129* (2013.01); *H04B 10/1143* (2013.01); *H04B 10/1149* (2013.01)

(58) Field of Classification Search
CPC .................. H04B 10/1123–10/1129; H04B 10/1143–10/116
See application file for complete search history.

(56) References Cited

U.S. PATENT DOCUMENTS

| | | | |
|---|---|---|---|
| 6,339,503 B1* | 1/2002 | Derstine et al. | ................ 359/622 |
| 8,260,146 B2 | 9/2012 | Graves | |
| 8,315,526 B2 | 11/2012 | Tan et al. | |
| 2001/0043381 A1 | 11/2001 | Green et al. | |
| 2002/0109884 A1 | 8/2002 | Presley et al. | |
| 2002/0181055 A1* | 12/2002 | Christiansen et al. | ........ 359/159 |
| 2013/0236183 A1* | 9/2013 | Chao et al. | .................... 398/101 |
| 2015/0098675 A1* | 4/2015 | Ishiyama et al. | ................ 385/14 |

FOREIGN PATENT DOCUMENTS

WO 0103242 A1 1/2001

OTHER PUBLICATIONS https://en.wikipedia.org/wiki/Cardinal_point_(optics).*
Murat Yuksel et al., "Free-space-optical mobile ad hoc networks: Auto-configurable building blocks", Apr. 2009, 25 pages, vol. 15 Issue 3, J. of Wireless Networks, Kluwer Academic Publishers Hingham, MA, USA.
Invitation to Pay Additional Fees and Partial Search Report for PCT/US2014/068022 dated Mar. 23, 2015.
Bouchet, et al., "Broadcast of four HD videos with LED ceiling lighting: optical-wireless MAC", Free Space and Atmospheric Laser Communications XI, vol. 8162, No. 1, Sep. 8, 2011, pp. 1-12.

* cited by examiner

*Primary Examiner* — David Payne
*Assistant Examiner* — Casey Kretzer (57) ABSTRACT

Free space optics (FSO) is a wireless technology that utilizes optical frequencies. Previously available FSO transceivers are restricted to point-to-point links because of the high directivity of laser light used to transmit data. By contrast, various implementations disclosed herein include a multi-beam FSO apparatus that is less reliant on point-to-point links, and includes a lens assembly and a planar array of optical communication devices. The lens assembly includes at least one surface shaped to direct ingress light received substantially within a first angular range towards a focal plane, and to direct egress light away from the focal plane into the first angular range. The planar array includes a plurality of optical communication devices arranged in association with the focal plane of the lens assembly, wherein each of the plurality of optical communication devices characterizes at least one of a plurality of optical communication link endpoints.

16 Claims, 8 Drawing Sheets

MULTI-BEAM FREE SPACE OPTICAL ENDPOINT

TECHNICAL FIELD

The present disclosure relates to data communications, and in particular, to systems, methods and apparatuses enabling a multi-beam free space optical endpoint.

BACKGROUND

The ongoing development of data networks includes improving wireless access to useable bandwidth. Wireless access, for example, enables mobile communication and more concentrated management of operator-maintained physical network infrastructure assets. Wireless data networks that use radio frequency (RF) technologies (e.g., cellular networks, WiFi) are often bandwidth limited within defined bands of spectrum. In an area with a high concentration of client devices relative to a bandwidth allocation managed by an access point (e.g., a cellular base station), each client device can be restricted to a few kilobits (kb) of data throughput. Additionally, the frequency spectrum bands designated for cellular data traffic are typically licensed to operators that pass on the licensing costs to subscribers.

Free space optics (FSO) is a wireless technology that utilizes optical frequencies. A FSO data link can provide orders of magnitude more bandwidth than a RF data link. However, previously available FSO transceivers are restricted to point-to-point links because of the high directivity of the light beams used to transmit data. In turn, previously available FSO data links include a discrete FSO transceiver at each end of a point-to-point link. In order to increase the number of data links a single FSO transceiver can service scanning systems have been proposed that include mechanically changing the transceiver sighting and using active beam deflectors to track moving clients, and/or systematically connect to a sequence of several clients in their view. However, previously available FSO transceivers are large and rely on precise sighting, and in turn, the scanning systems are costly, delicate, slow, cumbersome, mechanically complex, and power hungry. Alternatively, previously available multi-beam FSO endpoint assemblies include a curved-surface that is tessellated with an array of discrete FSO transceivers. Each FSO transceiver covers a solid angle of space emanating from a respective point on the curved-surface. Such an assembly is large, expensive, difficult to assemble and repair, and difficult to align so that individual beams are transmitted or received from the intended points on the curved-surface. In view of the aforementioned issues, the scalability of FSO networks using previously available multi-beam FSO transceivers is quite limited.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Previously available free space optical (FSO) transceivers are restricted to point-to-point links because of the high directivity of the light beams used to transmit data. By contrast, various implementations disclosed herein include a multi-beam FSO apparatus that is simultaneously operable on one or more point-to-point links, and includes a lens assembly and a planar array of optical communication devices. The lens assembly includes at least one surface shaped to direct ingress light received substantially within a first angular range towards a focal plane, and to direct egress light away from the focal plane into the first angular range. The planar array includes a plurality of optical communication devices arranged in association with the focal plane of the lens assembly, wherein each of the plurality of optical communication devices characterizes at least one of a plurality of optical communication link endpoints.

Figure 1:
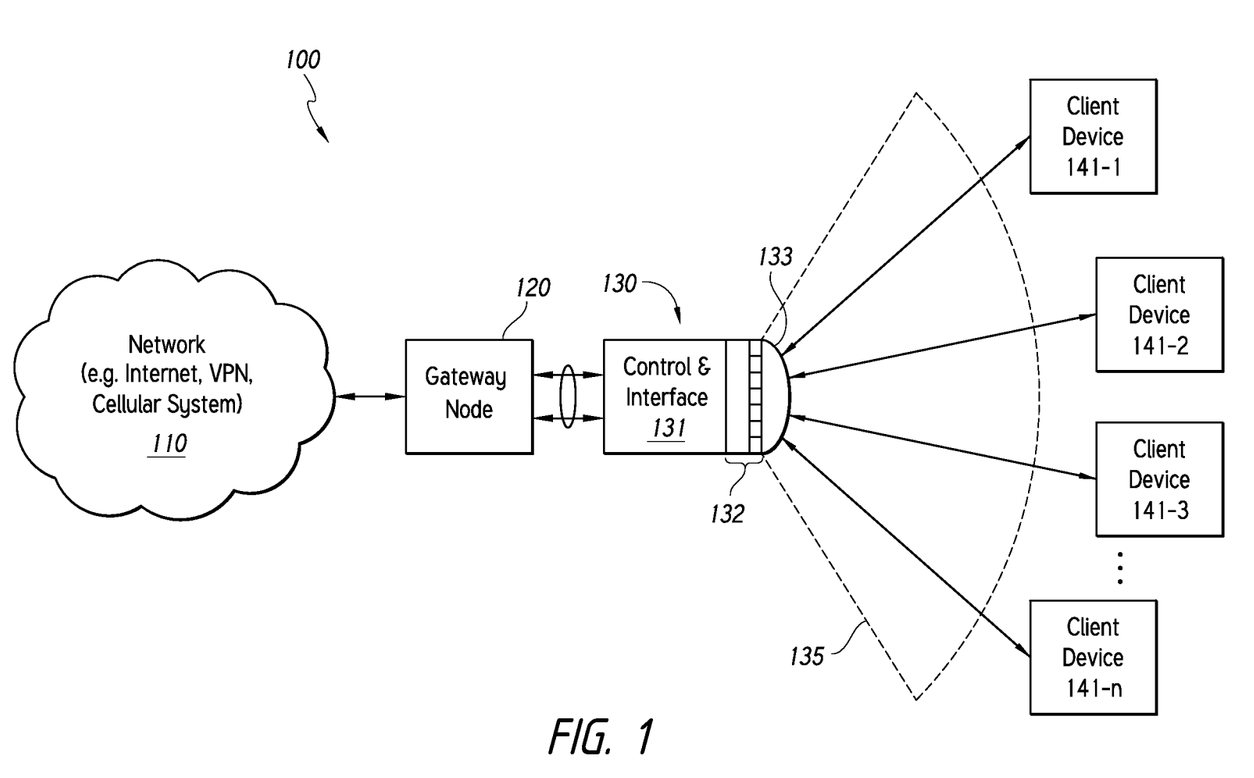
FIG. 1 is a block diagram of a free space optical (FSO) data communication environment in accordance with some implementations.

FIG. 1 is a block diagram of a FSO data communication environment 100 in accordance with some implementations. While pertinent features are illustrated, those of ordinary skilled in the art will appreciate from the present disclosure that various other features have not been illustrated for the sake of brevity and so as not to obscure more pertinent aspects of the example implementations disclosed herein. To that end, as a non-limiting example, the FSO data communication environment 100 includes a plurality of client devices 141-1, 141-2, 141-3, . . . 141-*n*, a multi-beam FSO endpoint 130, a gateway node 120 and a network 110.

The gateway node 120 couples the multi-beam FSO endpoint 130 to the network 110. For the sake of brevity and convenience FIG. 1 illustrates a single gateway node in combination with a single multi-beam FSO endpoint. Those of ordinary skill in the art will appreciate that in various implementations any arbitrary number of gateway nodes are each communicatively coupled to any arbitrary number of multi-beam FSO endpoints in order to establish at least a portion of a FSO data communication environment. Moreover, in various implementations, the gateway node 120 provides the multi-beam FSO endpoint 130 with access to any one of a number of communication networks including a RF wireless network, an optical cable network, a wireline network, a local area network (LAN) and/or wide area network (WAN), such as an intranet, an extranet, a virtual private network, or the Internet. Additionally and/or alternatively, in some implementations, multiple gateway nodes are provided for a multi-beam FSO endpoint, and each gateway node provides the multi-beam FSO endpoint with access to a respective communication network and/or service. In some implementations, the gateway node 120 is integrated with the multi-beam FSO endpoint 130. In some implementations, the gateway node 120 includes one or more computing and/or routing devices, which are distributed or collocated depending on operating and resource allocation factors pertinent to a particular deployment.

As shown in FIG. 1, the multi-beam FSO endpoint 130 includes a control and interface module 131, a planar array of optical communication devices 132 and a lens assembly 133. As described in greater detail below with reference to FIGS. 2 and 3, the multi-beam FSO endpoint 130 provides a number of optical beam data channels within an angular range 135. Each of the optical beam data channels enables free space optical communication with one or more of the plurality of client devices 141-1, 141-2, 141-3, . . . 141-n. Each of the optical beam data channels has a respective angular portion on the lens assembly 133 from which it is directed to or from the planar array of optical communication devices 132. More specifically, the lens assembly 133 includes at least one surface shaped to direct ingress light received substantially within the angular range 135 towards the planar array of optical communication devices 132, and to direct egress light away from the planar array of optical communication devices 132 into the first angular range 135 towards one or more of the client devices 141-1, 141-2, 141-3, . . . 141-n. As such, the multi-beam FSO endpoint 130 couples the plurality of client devices 141-1, 141-2, 141-3, . . . 141-n to the network 110 through the gateway node 120. Again for the sake of brevity and convenience FIG. 1 illustrates a single multi-beam FSO endpoint in combination with a group of client devices. And again, those of ordinary skill in the art will appreciate that in various implementations any arbitrary number of multi-beam FSO endpoints are each communicatively coupled to any arbitrary number of client devices in order to establish at least a portion of a FSO data communication environment.

Each of the plurality of client devices 141-1, 141-2, 141-3, . . . 141-n generally includes any suitable computer device, such as a computer, a laptop computer, a tablet device, a netbook, an internet kiosk, a personal digital assistant, a mobile phone, a smart phone, a gaming device, a computer server, or any other computing device. In some implementations, each client device 141-1, 141-2, 141-3, . . . 141-n includes one or more processors, one or more types of memory, a display and/or other user interface components such as a keyboard, a touch screen display, a mouse, a track-pad, a digital camera and/or any number of supplemental devices to add functionality.

The network 110 is any LAN and/or WAN, such as an intranet, an extranet, a virtual private network, or the Internet. In some implementations, the network 110 provides communication capability between any one of the client devices 141-1, 141-2, 141-3, . . . 141-n and one or more third party content servers and/or service servers (not shown). In some implementations, the network 110 provides communication capability between any one of the client devices 141-1, 141-2, 141-3, . . . 141-n and one or more private content servers, storage devices, gateways and/or service servers (not shown). In some implementations, the network 110 uses HyperText Transport Protocol (HTTP) to transport information using the Transmission Control Protocol/Internet Protocol (TCP/IP). The HTTP permits client devices to access various resources available via the network 110. However, implementations are not limited to the use of any particular protocol. The term "resource" as used throughout this specification refers to any piece of information or service that is accessible via a Uniform Resource Locator (URL) and includes, for example, a web page, a document, an email message, an Instant Messaging (IM) message, a Short Message Service (SMS) message, a transcribed voice message, a database, an image, a video stream, a cloud transaction, and a computational object.

In some implementations, a FSO data communication environment includes a subset or superset of the elements illustrated in FIG. 1. So although FIG. 1 shows the FSO data communication environment 100 as a number of discrete elements, FIG. 1 is intended to serve as more of a functional description of the various features which may be present in the FSO data communication environment 100 than as a structural schematic of the various implementations. For example, some elements shown separately could be combined and some elements could be further divided into sub-elements or parallel elements. Additionally, some separate elements in FIG. 1 could be implemented by a single server or module and some single elements could be implemented by one or more servers or modules. The actual number of servers in the FSO data communication environment 100 and how features are allocated among the servers will vary from one implementation to another, and may depend in part on the amount of traffic that the system must handle during peak usage periods as well as during average usage periods. For example, in some implementations, the gateway node 120 is implemented using a plurality of servers if the FSO data communication environment 100 manages a large volume of data traffic associated with a large number of client devices.

Figure 2:
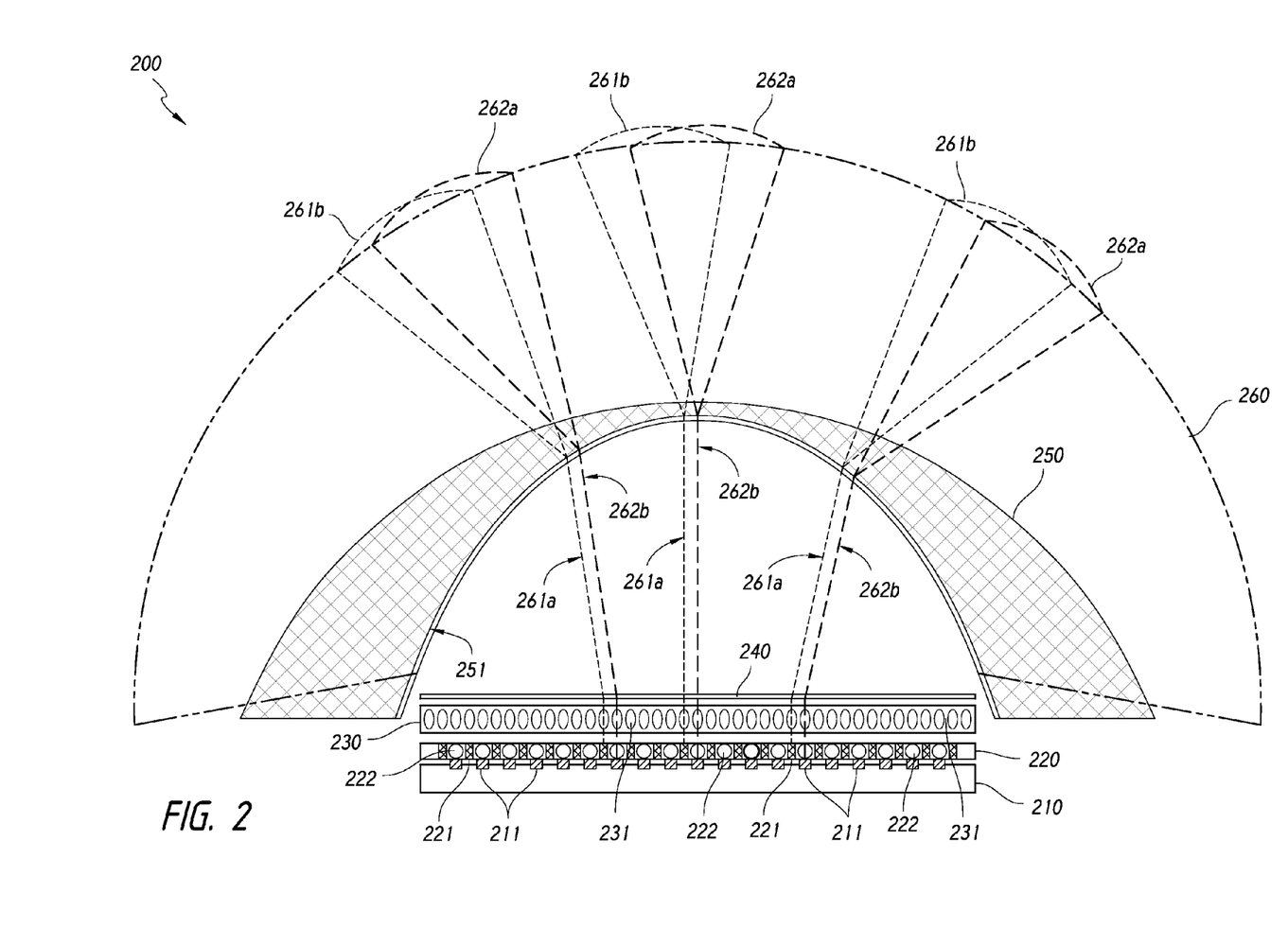
FIG. 2 is a cross section of a multi-beam FSO apparatus in accordance with some implementations.

FIG. 2 is a cross section of a multi-beam FSO apparatus 200 in accordance with some implementations, which is similar to and adapted from the multi-beam FSO endpoint described above with reference to FIG. 1. While pertinent features are illustrated, those of ordinary skill in the art will appreciate from the present disclosure that various other features have not been illustrated for the sake of brevity and so as not to obscure more pertinent aspects of the implementations disclosed herein. To that end, as a non-limiting example, the multi-beam FSO apparatus 200 includes a lens assembly 250, an optical band-pass filter 240, a planar optics module 230, a first substrate 220 and a second substrate 210.

In some implementations, the planar optics module 230 is arranged between the lens assembly 250 and the plurality of light transmission devices 221, so that the planar optics are configured to provide at least one of egress light beam geometry shaping and beam correction. As shown in FIG. 1, in some implementations, the optical band-pass filter 240 and the planar optics module 230 are arranged between the lens assembly 250 and the first substrate 220 so that planar optics module 230 is adjacent to the first substrate 220. However, in some implementations, the optical band-pass filter is adjacent to the first substrate 220. Additionally, as shown in FIG. 1, the first substrate 220 is arranged between the lens assembly 250 and the second substrate 210. The combination of the optical band-pass filter 240, the planar optics module 230, the first substrate 220 and the second substrate 210 are arranged substantially on the focal plane of the lens assembly 250.

The first substrate 220 includes an arrangement including a plurality of light transmission devices 221 manufactured on the first substrate 220 and a plurality of perforations 222. The plurality of perforations 222, in part, define a web of substrate material that mechanically supports and connects the plurality of light transmission devices 221 associated with the first substrate 220. In some implementations, the first substrate 220 is divided into two or more segments that are individually bonded over the second substrate 210, which may improve yield and/or assembly of the multi-beam FSO apparatus 200. The second substrate 210 includes a plurality of photo-detectors 211 that are correspondingly arranged below the plurality of perforations 222. In operation, beams of ingress light from the lens assembly 250 passes through the perforations 222 to the photo-detectors 211. That is, in some implementations, the first substrate 220 is perforated to include perforations to permit a plurality of beams of ingress light to pass through the perforations to the plurality of photo-detectors 211 on the second substrate 210. Moreover, in some implementations, the first substrate 220 includes a material system suitable for optical emitter manufacturing (e.g., laser device manufacturing). In some implementations, each of the plurality of photo-detectors 211 is controllable to receive modulated ingress light including reception data from a corresponding optical communication link. In some implementations, the number of light transmission devices substantially matches the number of photo-detectors. In some implementations, there are more or fewer photo-detectors than light transmission devices.

In some implementations, each of the plurality of light transmission devices 221 is controllable to modulate a respective beam of egress light to include transmission data onto a corresponding optical communication link occupying a specific portion of the first angular range. To that end, in some implementations, some of the plurality of light transmission devices 221 include one or more bond pads (not shown). In some implementations, the first substrate 220 is suitable for III-V semiconductor laser manufacturing. In some implementations, the first substrate 220 is suitable to manufacture a light emitting device using at least one of silicon carbide and carbon nanotubes. In some implementations, some of the plurality of light transmission devices 221 include one of a laser and a light emitting diode (LED). In some implementations, some of the plurality of light transmission devices 221 each include a vertical cavity surface emitting laser (VCSEL). In some implementations, VCSELs are produced using a different manufacturing process and/or different materials from the plurality of photo-detectors 211 on the second substrate 210.

The lens assembly 250 includes at least one surface shaped to direct ingress light received substantially within a first angular range 260 towards the focal plane of the lens assembly 250; and, to direct egress light away from the focal plane into the first angular range 260. In some implementations, the lens assembly 250 includes a filter coating 251. In some implementations, the filter coating 251 is at least one of wavelength sensitive and anti-reflective. In some implementations, the filter coating 251 is configured to at least one of reduce the amount of egress light reflected back to the focal plane, substantially reject ambient light and condition ingress light directed to the plurality of photo-detectors. In some implementations, a filter is characterized by at least one of being configured to effect beam forming, being wavelength sensitive, being anti-reflective, including a quarter-wave plate, and a coating on the at least one surface of the lens assembly. Moreover, while FIG. 1 shows the lens assembly 250 as a single element, in some implementations, the lens assembly includes multiple lens elements and/or multiple lens element groups.

In some implementations, the first angular range 260 comprises a range between 10 and 200 degrees spanning at least one dimension. In some implementations, the lens assembly 250 includes a fish-eye optical lens element. Some fish-eye optical lens elements provide a field of view that extends beyond 200 degrees. In some implementations, a fish-eye optical lens element is used to transmit and receive optical beams in directions extending throughout a hemisphere, and direct the optical beams to and from the focal plane.

In some implementations, the planar optics module 230 is provided to perform beam geometry shaping and correction. To that end, in some implementations, planar optics module 230 includes a plurality of micro-lenses 231. Each of the plurality of micro-lenses 231 is arranged to intercept and condition light traveling between the lens assembly 250 and one of the plurality of photo-detectors 211 and/or one of the plurality of light transmission devices 22. In some implementations, the plurality of micro-lenses 231 includes at least one of Fresnel lenslets, micro-machined lenses, molded lenses and holographic optics. In some implementations, the optical band-pass filter 240 is provided to reduce superfluous and ambient wavelengths from the surrounding environment in order to reduce susceptibility to solar overloading, ambient light levels and/or deliberate jamming.

In some implementations, at least some of the plurality of photo-detectors 211 and the plurality of light transmission devices 221 comprise a planar array including a plurality of optical communication devices arranged in association with the focal plane of the lens assembly 250. As described in greater detail below, each of the plurality of optical communication devices characterizes at least one of a plurality of optical communication link endpoints. Each respective portion of the first angular range 260 and the corresponding respective area on the focal plane characterize at least a portion of a respective optical communication link associated with at least one of the plurality of optical communication link endpoints. As such, in some implementations, the beam channels are arranged in concentric rings between the center and periphery of the first and second substrates 220, 210 so that beams overlap and tessellate the hemisphere defined by the first angular range 260.

For example, each light transmission device 221 provides a beam 261a, which is slighting spread by the lens assemble 250 to produce a divergent transmission beam 261b that is splayed into a respective portion of the first angular range 260. In other words, the lens assembly 250 (an optionally the planar optics module 230) directs a beam of egress light away from the at least one of the plurality of optical communication devices into the corresponding respective portion of the first angular range 260. As noted above, the light beam transmitted by each light transmission device 221 can be modulated to include transmission data for a respective optical beam data channel. Reciprocally, the lens assembly 250 focuses an ingress light received within portions 262a of the first angular range 260 to produce respective beams 262b. Each of the respective beams 262b is directed to a corresponding one of the plurality of photo-detectors 211 on the second substrate 210. In other words, the lens assembly 250 directs a beam of ingress light received within a respective portion of the first angular range to a corresponding respective area on the focal plane that is associated with at least one of the plurality of optical communication devices.

In some implementations the transmitted and received beams deliberately diverge by approximately 1.5 times the angular spacing between the centers of the beams (e.g., about 15 degrees in some implementations). This produces overlap in the far field, insuring that the first angular range 260 of the multi-beam FSO apparatus 200 is covered by at least one receive and one transmit beam in some implementations. Moreover, the corresponding transmit and receive beams associated with a given channel are not precisely coincident because of the offset between each photo-detector and an adjacent light transmission device that characterizes the channel. In turn, this creates a slight misalignment between transmit and receive beam positions in the far field for a given channel. In some implementations, the plainer optics module 230 is configured to mitigate some of this misalignment.

Figure 3:
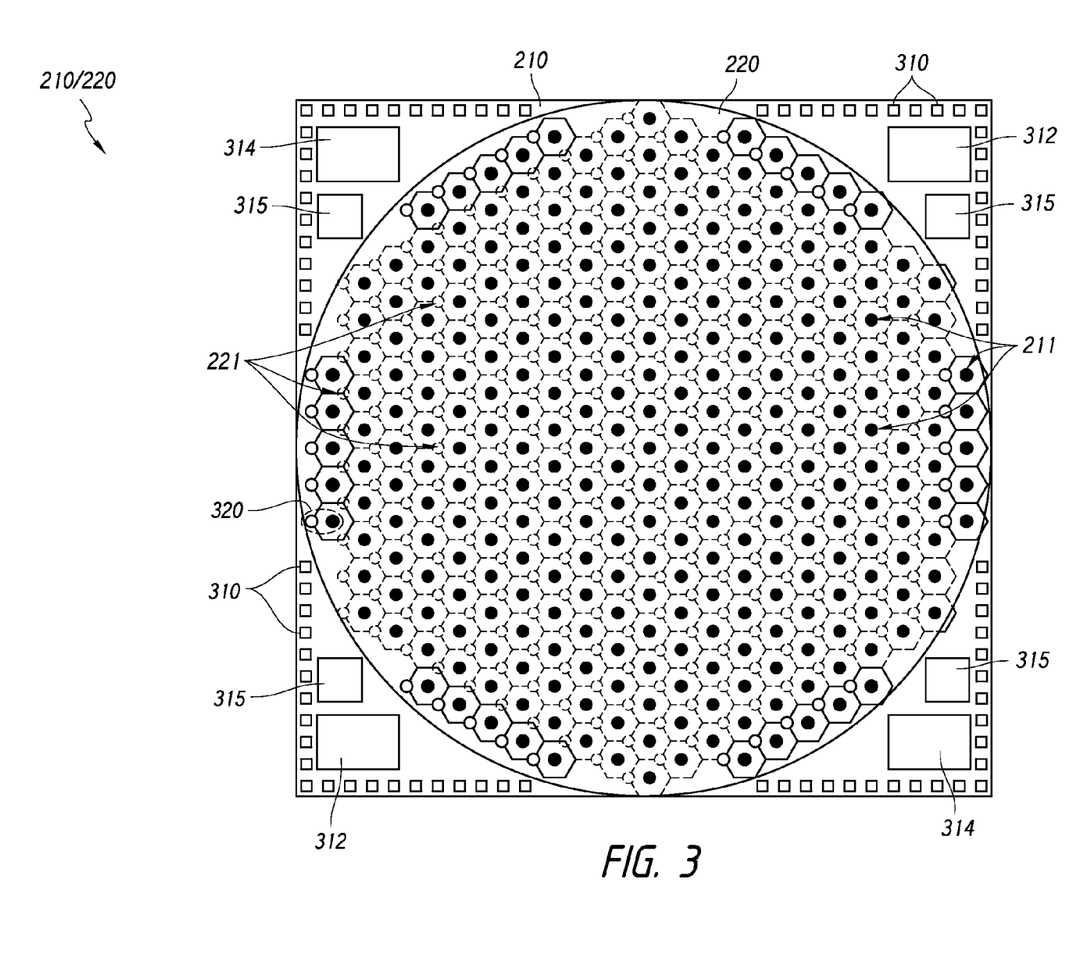
FIG. 3 is a plan view of a planar array of optical communication devices included in a multi-beam FSO apparatus in accordance with some implementations.

FIG. 3 is a plan view of the planar array of optical communication devices included on the first and second substrates 220, 210 of FIG. 2. Accordingly, elements common to each include common reference numbers, and only aspects that cannot be seen in FIG. 2 are described with reference to FIG. 3 for the sake of brevity. Moreover, while certain specific features are illustrated, those skilled in the art will appreciate from the present disclosure that various other features have not been illustrated for the sake of brevity and so as not to obscure more pertinent aspects of the example implementations disclosed herein.

To that end, FIG. 3 shows that the plurality of light transmission devices 221 and the plurality of photo-detectors 211 are arranged as a plurality of device groups 320. Each of the plurality of device groups includes at least one of each of the plurality of light transmission devices 221 and the plurality of photo-detectors 211. More specifically, FIG. 3 shows approximately 300 device groups in one specific implementation. The number of device groups was, at least in part, a result of the hexagonal tessellation pattern used to arrange the plurality of light transmission devices 221 and the plurality of photo-detectors 211. The hexagonal tessellation pattern is merely one of many possible arrangements that is employed in various implementations. Those of ordinary skill in the art will appreciate that other tessellation patterns (e.g., grid, concentric ring, and fractal patterns) are used in various other implementations.

Additionally, FIG. 3 shows a number of functional communication modules integrated on the second substrate 210, including memory modules 315, processing and/or logic modules 314 and interface modules 312. The second substrate 210 also includes a number of connection pads 310 that facilitate electrical connections to and from devices and/or modules on the second substrate 210. In some implementations, the first substrate 220 includes connection pads (not shown) on the surface of the proximate to the second substrate 210 in order facilitate electrical connections to and from devices and/or modules on the second substrate 210. In some implementations, the substrate 210 includes at least a portion of a control module and at least a portion of the plurality of optical communication devices.

Figure 4:
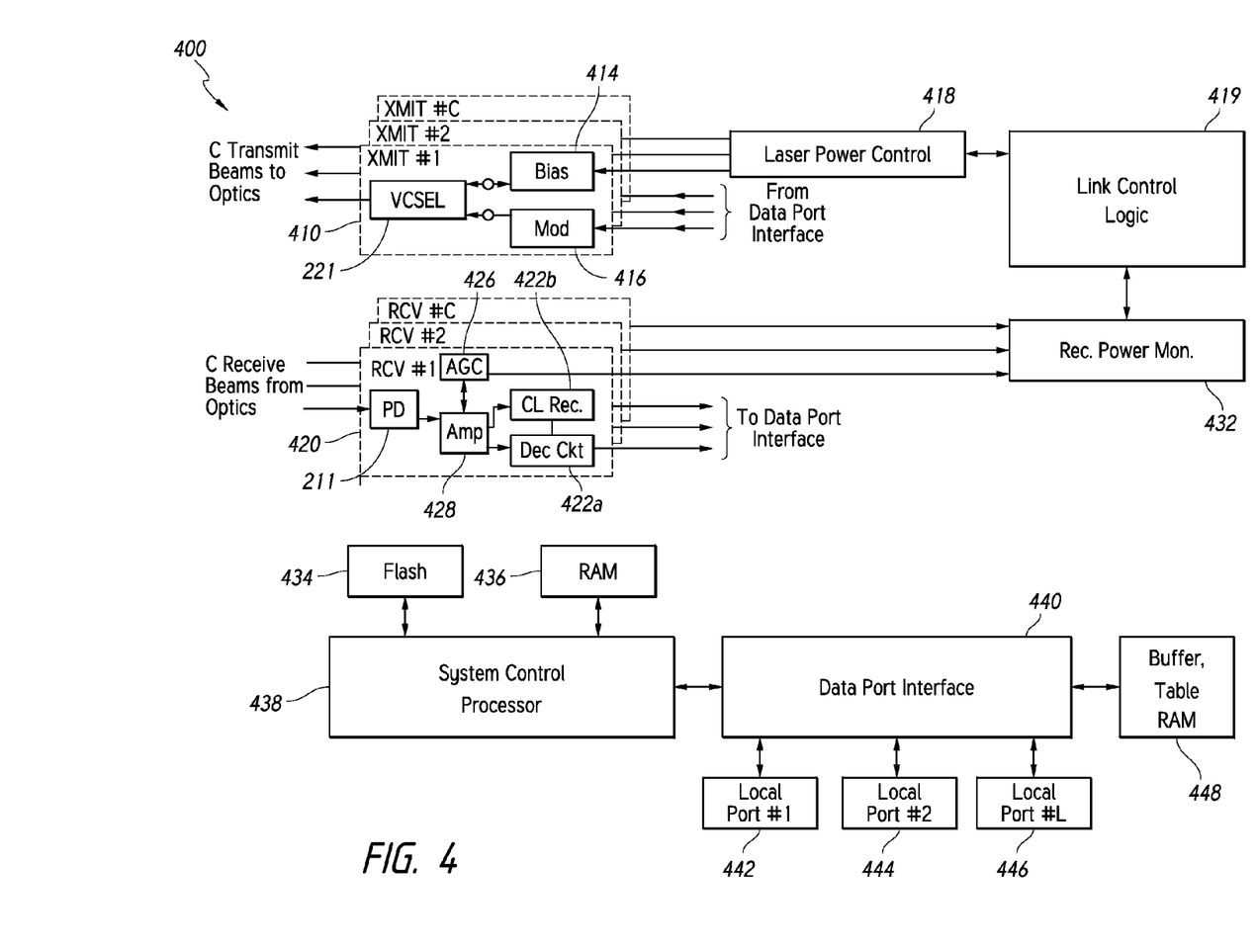
FIG. 4 is a block diagram of a configuration of communication electronics included in a multi-beam FSO apparatus in accordance with some implementations.

FIG. 4 is a block diagram of an example configuration of communication electronics 400 included in a multi-beam FSO apparatus in accordance with some implementations. Again, while pertinent features are illustrated, those of ordinary skill in the art will appreciate from the present disclosure that various other features have not been illustrated for the sake of brevity and so as not to obscure more pertinent aspects of the example implementations disclosed herein. In some implementations, the communication electronics 400 includes a control module coupled to the plurality of optical communication devices. In some implementations, the control module configured to manage and provide an external interface for the plurality of optical communication link endpoints, and includes at least one of a processor, digital logic, programmable firmware, and an allocation of memory. In some implementations, the control module is configured to provide at least one of protocol processing, modulation, demodulation, data buffering, power control, routing, switching, clock recovery, amplification, decoding, and error control. In some implementations, at least a portion of the control module and at least a portion of the plurality of optical communication devices are provided on a first substrate.

More specifically, as a non-limiting example, the communication electronics 400 includes a plurality of transmitters 410, a plurality of receivers 420, a transmitter power control module 418, link control logic 419, a received power monitor module 432, a flash memory module 434, a RAM memory module 436, a system control processor 438, a data port interface 440, a buffer table 448, and local ports 442, 444 and 446. The transmitter power control module 418 is coupled between the plurality of transmitters 410 and the link control logic 419. The received power monitor module 432 is coupled between the plurality of receivers 420 and the link control logic 419. The plurality of transmitters 410 and the plurality of receivers 420 are coupled to the data port interface 440, which is, in turn, coupled to the system control processor 438, buffer table 448 and the local ports 442, 444 and 446. The system control processor 438 is coupled to the flash memory module 434 and the RAM memory module 436. In some implementations, the system control processor 438 includes a fog computing node.

Each transmitter 410 includes a respective light transmission device 221 (e.g., a VCSEL, a LED, etc.), a bias module 414 and a modulator 416. The bias module 414 operates to set the quiescent conditions for the respective light transmission device 221. The modulator 416 operates to receive data from the data port interface 440 and control the respective light transmission device 221 so that the data stream is modulated onto a transmitted beam of light. The transmitter power control module 418 operates to control the transmit powers from each of the light transmission devices 221 in response to a control signal from the link control logic 419.

Each receiver 420 includes a respective photo-detector 211, an automatic gain control (AGC) module 426, and amplifier 428, a clock recovery module 422b and a demodulator and decoding module 422a. The AGC module 426 senses and provides a received power indicator from the respective photo-detector 211 to the link control logic 419. The amplifier 428 is provided to amplify and set the noise floor of the received signal from the respective photo-detector 211. The clock recovery circuit 422b is provided to acquire bit timing and enable synchronization of the received data signal so that the received data signal can be demodulated and decoded by the demodulator and decoding module 422a. The respective demodulated and decoded signal is then passed to the data port interface 440, which routes one or more demodulated and decoded signals to the appropriate one or more of the local ports 442, 444 and 446.

In operation, the system control processor 438 coordinates the operation of the communication electronics 400. In some implementations, the system control processor 438 is configured to manage and provide an external interface for the plurality of optical communication link endpoints, and includes at least one of a processor, digital logic, programmable firmware, and an allocation of memory. For example, in some implementations, the system control processor 438 functions include determining which links are active based on one or more indicators provided by the received power monitor 432. Additionally and/or alternatively, in some implementations, the system control processor 438 operates to coordinate laser power control setting to enable one or more transmissions channels. Additionally and/or alternatively, in some implementations, the system control processor 438 operates to direct data traffic in the data port interface 440 between the local ports 442, 444, 446 and the transmitter 410 and receivers 420.

Figure 5:
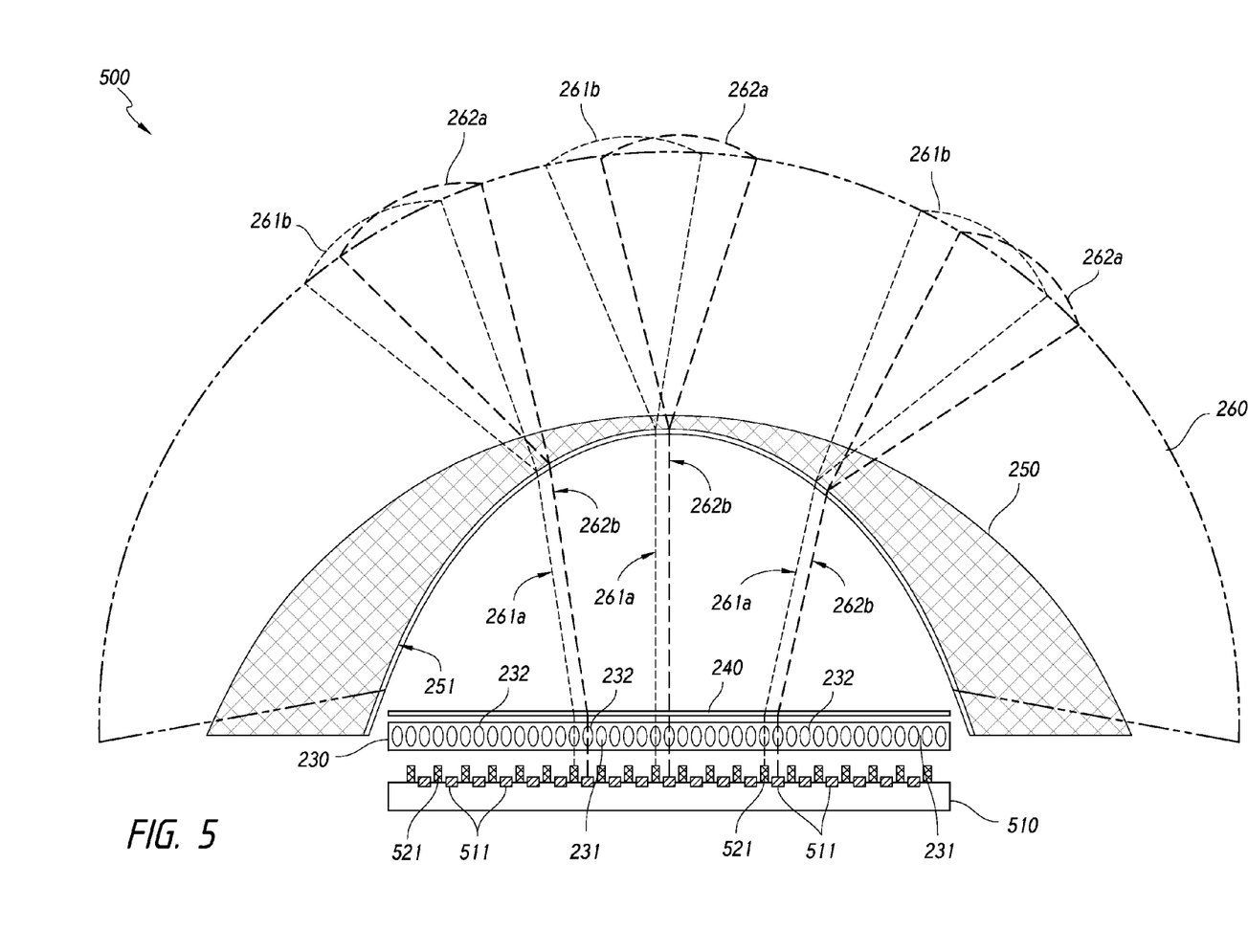
FIG. 5 is a cross section of another multi-beam FSO apparatus in accordance with some implementations.

FIG. 5 is a cross section of another multi-beam FSO apparatus 500 in accordance with some implementations. The multi-beam FSO apparatus 500 is similar to and adapted from the multi-beam FSO apparatus 200 of FIG. 2. Elements common to each include common reference numbers, and only the differences between FIGS. 2 and 5 are described herein for the sake of brevity. To that end, as compared to the multi-beam FSO apparatus 200, the multi-beam FSO apparatus 500 does not include two substrates. Instead, a substrate 510 includes both a plurality of the light transmission devices 521 and a plurality of photo-detectors 511. In some implementations, the substrate 510 is a silicon-based substrate, and the plurality of the light transmission devices 521 are bonded to the substrate 510. In some implementations, the plurality of the light transmission devices 521 are manufactured on the substrate 510. In some implementations, the plurality of light transmission devices 521 and some of the plurality of photo-detectors 511 are substantially uniformly arranged in the planar array. In some implementations, some of the plurality of light transmission devices 521 and some of the plurality of photo-detectors 511 are substantially uniformly arranged in the planar array forming at least one of a hexagonal ring arrangement, a fractal pattern, and a grid pattern.

Figure 6:
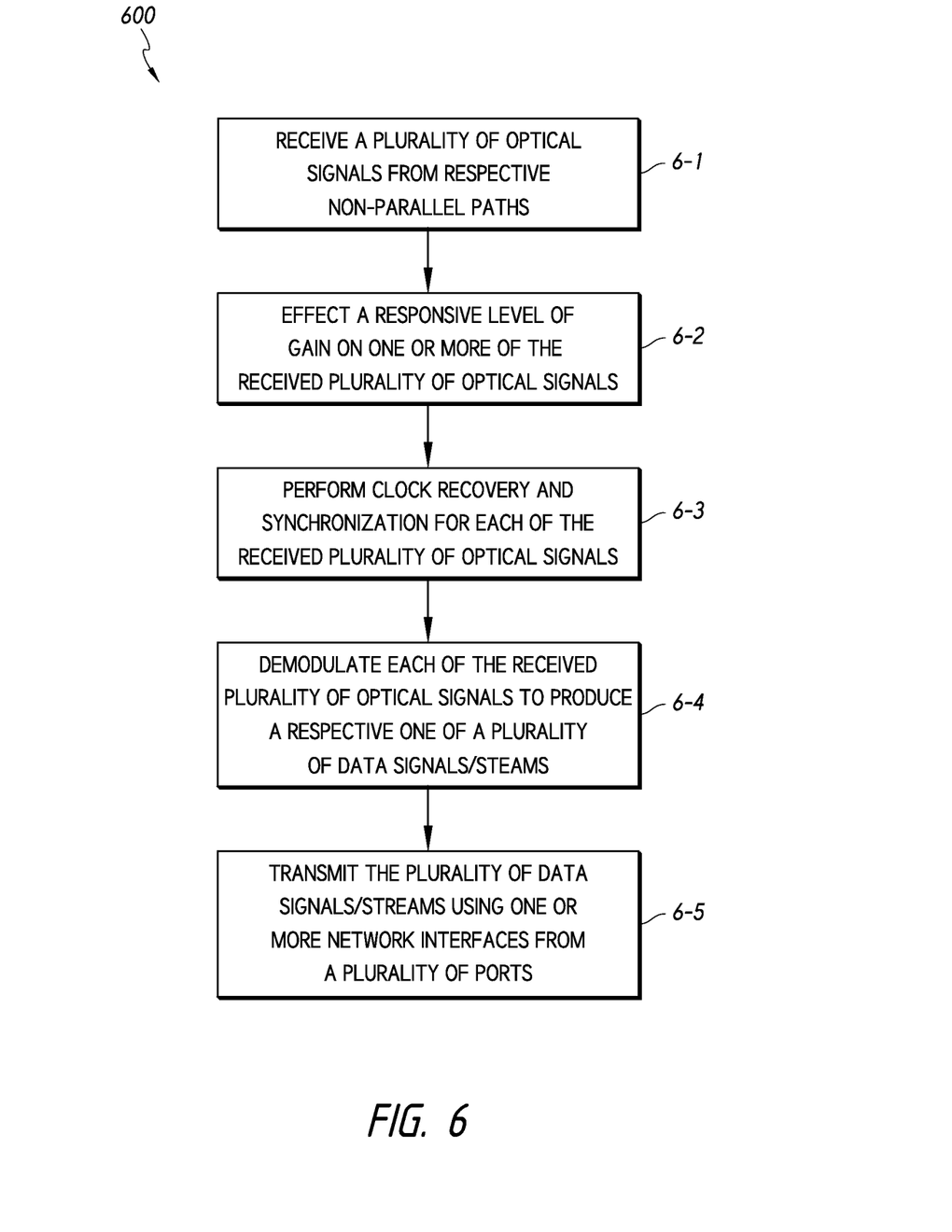
FIG. 6 is a flowchart representation of a method of receiving optical data signals using a multi-beam FSO apparatus in accordance with some implementations.

FIG. 6 is a flowchart representation of a method 600 of receiving optical data signals using a multi-beam FSO apparatus in accordance with some implementations. Briefly, the method 600 includes receiving one or more modulated beams from within the first angular range of the multi-beam FSO apparatus, demodulating the data flows, and routing the data flows through the ports of the multi-beam FSO apparatus.

To that end, as represented by block 6-1, the method 600 includes receiving a plurality of optical signals from respective non-parallel paths within the first angular range of the multi-beam FSO apparatus. For example, with reference to FIG. 2, ingress optical signals 262a are first received within the first angular range 260 of the lens assembly 250. The lens assembly 250 focuses the ingress optical signals 262a into optical beams 262b, and directs each of the optical beams to respective photo-detectors 211.

As represented by block 6-2, the method 600 includes amplifying one or more of the received plurality of optical signals. For example, with reference to FIG. 4, in some implementations, for some of the plurality of optical signals the respective amplifier 428 and AGC module 426 effect an appropriate level of gain based at least on an indication of the received power of the received optical signal.

As represented by block 6-3, the method 600 includes performing clock recovery and synchronization for each of the received plurality of optical signals. For example, with reference to FIG. 4, the respective clock recovery module 422b in each receiver 420 performs the clock recovery and synchronization. As represented by block 6-4, the method includes demodulating and/or decoding each of the received plurality of optical signals in order to produce a respective one of a plurality of data signals or streams. For example, with reference to FIG. 4, the demodulator and decoding module 422a performs the demodulating and/or decoding of each of the received plurality of optical signals in order to produce a respective one of a plurality of data signals or streams. As represented by block 6-5, the method 600 includes transmitting the plurality of data signal or streams using one or more network interfaces from a plurality of ports. For example, with reference to FIG. 4, the data port interface 440 routes one or more demodulated and decoded signals to the appropriate one or more of the local ports 442, 444 and 446 in order to transmit the signals to one or more network interfaces (e.g. a cellular network gateway).

Figure 7:
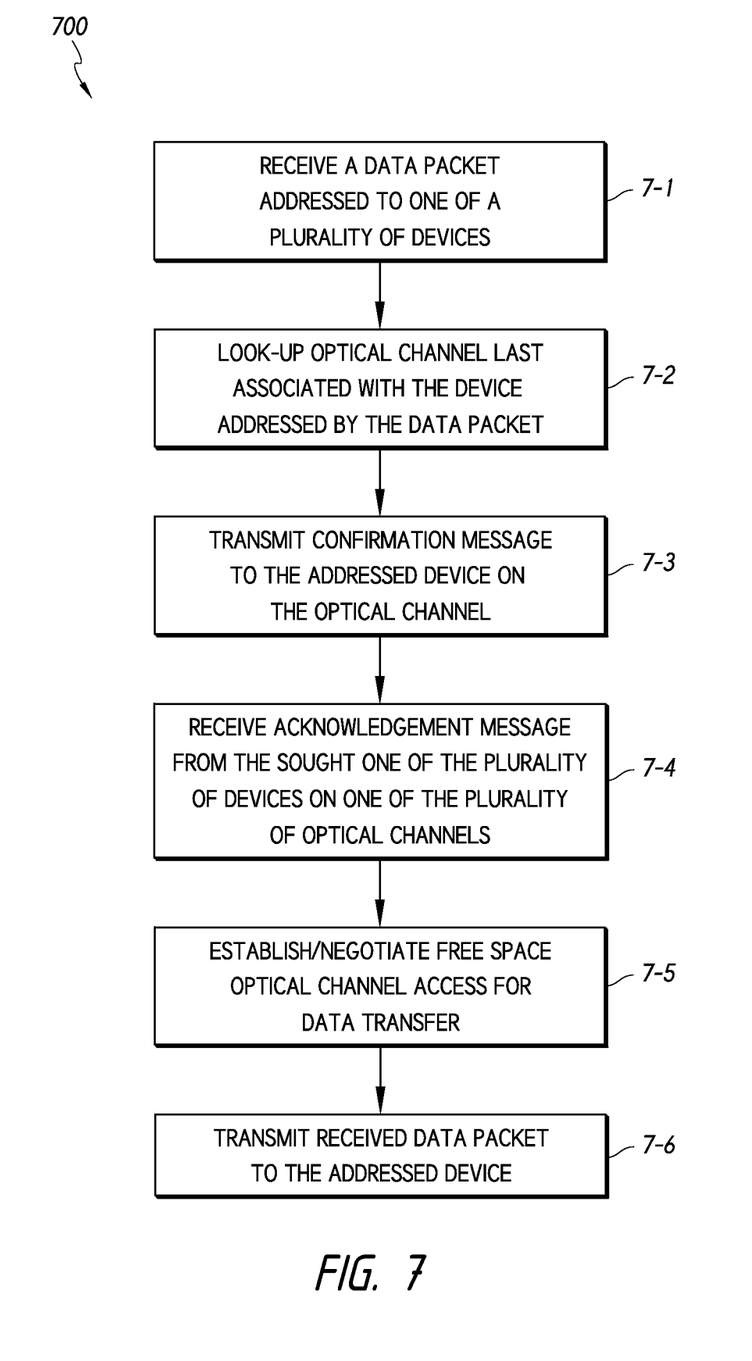
FIG. 7 is a flowchart representation of a method of transmitting an optical data signal using a multi-beam FSO apparatus in accordance with some implementations.

FIG. 7 is a flowchart representation of a method 700 of transmitting an optical data signal using a multi-beam FSO apparatus in accordance with some implementations. Briefly, the method 700 includes receiving a data packet addressed to a client device, identifying a particular optical beam data channel that couples the addressed client device to a multi-beam free space optical apparatus, wherein each optical beam data channel is provided by a multi-beam free space optical apparatus, and transmitting the data packet on the identified channel to the addressed client device from the multi-beam free space optical apparatus. In some implementations, each optical beam data channel is at least one of transmitted and received within a first angular range of the multi-beam free space optical apparatus, and at least one of transmitted and received by a planar array including a plurality of optical communication devices of the multi-beam free space optical apparatus.

To that end, as represented by block 7-1, the method 700 includes receiving a data packet addressed to one of a plurality of devices. For example, with reference to FIG. 4, the data port interface 440 receives the data packet. As represented by block 7-2, the method 700 includes identifying a particular optical beam data channel that communicatively couples the addressed client device to the multi-beam FSO apparatus by performing a table look-up operation. For example, with reference to FIG. 4, the system control processor 438 identifies the particular optical beam data channel by retrieving and/or accessing a look-up table (including client device channel assignments) stored in at least one of the flash memory 434 and the RAM 436.

As represented by block 7-3, the method includes transmitting a confirmation message to the addressed client device on the identified optical beam data channel in order to confirm that device-channel assignment is valid. As represented by block 7-4, the method 700 includes receiving an acknowledgement message that is responsive to the confirmation message, from the addressed client device. As represented by block 7-5, the method 700 includes establishing and/or negotiating free space optical channel access for data transfer between the addressed client device and the multi-beam FSO apparatus on the identified optical beam data channel. As represented by block 7-6, the method 700 includes transmitting the addressed data packet to the addressed client device on the identified optical beam data channel.

Figure 8:
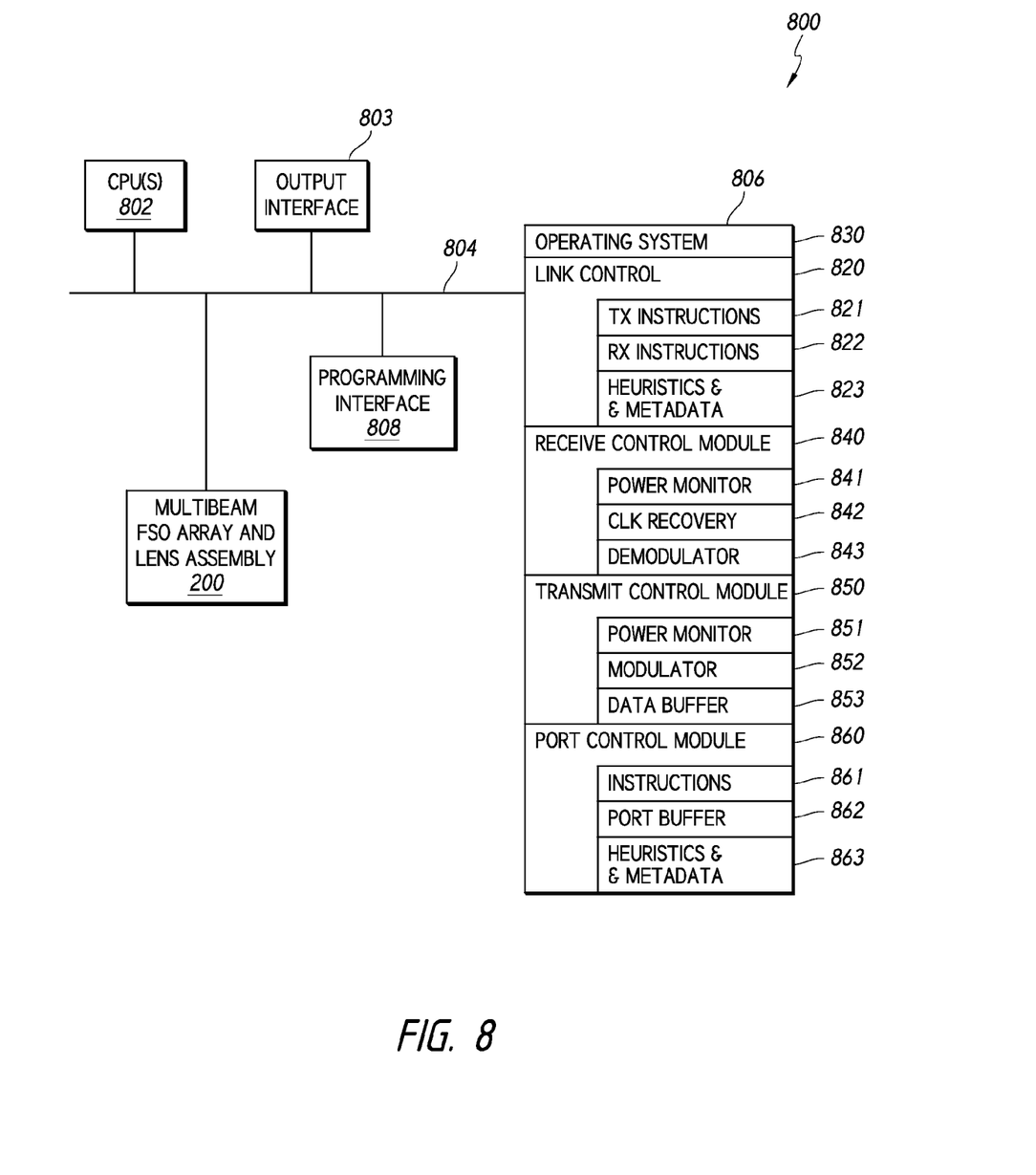
FIG. 8 is a block diagram of a multi-beam FSO system in accordance with some implementations.

FIG. 8 is a block diagram of a multi-beam FSO endpoint system 800 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the multi-beam FSO endpoint system 800 includes a multi-beam FSO apparatus 200, one or more processing units (CPU's) 802, one or more output interfaces 803, a memory 806, a programming interface 808, and one or more communication buses 804 for interconnecting these and various other components.

For the sake of brevity and convenience, the multi-beam FSO apparatus 200 includes the features described above with reference to FIG. 2. However, those of ordinary skill in the art will appreciate that various implementations of a multi-beam FSO apparatus are contemplated, including the multi-beam FSO apparatus 500 illustrated in FIG. 5.

In some implementations, the communication buses 804 include circuitry that interconnects and controls communications between system components. The memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some implementations, the memory 806 or the non-transitory computer readable storage medium of the memory 806 stores the following programs, modules and data structures, or a subset thereof including an optional operating system 830, a link control module 820, a receive control module 840, a transmit control module 850, and a port control module 860.

The operating system 830 includes procedures for handling various basic system services and for performing hardware dependent tasks.

In some implementations, the link control module 820 is configured to control and/or condition transmission power across multiple optical beam data channels transmitted by the multi-beam FSO apparatus 200; and, control and/or equalize receiver gain across multiple optical beam data channels received by the multi-beam FSO apparatus 200. To that end, in some implementations, the link control module 820 includes a set of transmitter instructions 821, a set of receiver instructions 822, and heuristics and metadata 823. In some implementation, the heuristics and metadata 823 include, for example, a log of previous settings and a lookup table of communication parameters associated with one or more client devices.

In some implementations, the receive control module 840 is configured to recover data from one or more optical beam data channels received by the multi-beam FSO apparatus 200. To that end, in some implementations, the receive control module 840 includes a receiver power monitor 841 (e.g., including data structures), a clock recovery module 842, and a demodulator 843.

In some implementations, the transmit control module 850 is configured to prepare the transmission data for one or more optical beam data channels transmitted by the multi-beam FSO apparatus 200. To that end, in some implementations, the transmit control module 850 includes a transmit power monitor 851 (e.g., including data structures), a modulator 852, and a data buffer 853.

In some implementations, the port control module 860 is configured to route data streams to and from local ports. To that end, in some implementations, the port control module 860 includes a set of instructions 861, a port buffer 862, and heuristics and metadata 863.

In some implementations, a device and/or a circuit having one or more features described herein can be included in any number of communication devices. Such a device and/or a circuit can be implemented directly in the communication device, in a modular form as described herein, or in some combination thereof. In some embodiments, such a communication device can include, for example, a cellular phone, a smart-phone, a hand-held wireless device with or without phone functionality, a tablet, a router, an access point, a base station, a server, etc. That is, those skilled in the art will also appreciate from the present disclosure that in various implementations the multi-beam FSO apparatus is included in various devices, such as a computer, a laptop computer, a tablet device, a netbook, an internet kiosk, a personal digital assistant, an optical modem, a base station, a repeater, a wireless router, a mobile phone, a smartphone, a gaming device, a computer server, or any other computing device. In various implementations, such devices include one or more processors, one or more types of memory, a display and/or other user interface components such as a keyboard, a touch screen display, a mouse, a track-pad, a digital camera and/or any number of supplemental devices to add functionality.

A number of other device configurations can utilize one or more features described herein. For example, a device does not need to be a multi-band device. In another example, a device can include one or more multi-beam FSO apparatuses, and additional connectivity features such as Wi-Fi, Bluetooth, and GPS.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. An apparatus comprising:
a lens assembly including at least one surface shaped to direct ingress light received substantially within a first angular range towards a focal plane, and to direct egress light away from the focal plane into the first angular range;
a planar array including a plurality of optical communication devices arranged in association with the focal plane of the lens assembly, wherein each of the plurality of optical communication devices characterizes at least one of a plurality of optical communication link endpoints, wherein the plurality of optical communication devices comprises a plurality of light transmission devices, wherein each of the plurality of light transmission devices is controllable to modulate a respective beam of egress light to include transmission data onto a corresponding optical communication link occupying a specific portion of the first angular range;
a first substrate including a first subset of the plurality of optical communication devices; and
a second substrate including a second subset of the plurality of optical communication devices, and
wherein the first substrate is perforated to include perforations that permit a plurality of beams of light to pass to or from the second subset of the plurality of optical communication devices of the second substrate.

2. The apparatus of claim 1, wherein the first angular range comprises a range between 10 and 200 degrees spanning at least one dimension.

3. The apparatus of claim 1, wherein the lens assembly directs a beam of ingress light received within a respective portion of the first angular range to a corresponding respective area on the focal plane that is associated with at least one of the plurality of optical communication devices, and directs a beam of egress light away from the at least one of the plurality of optical communication devices into the corresponding respective portion of the first angular range.

4. The apparatus of claim 3, wherein each respective portion of the first angular range and the corresponding respective area on the focal plane characterize at least a portion of a respective optical communication link associated with at least one of the plurality of optical communication link endpoints.

5. The apparatus of claim 1 further comprising a filter that is configured to at least one of reduce the amount of egress light reflected back to the focal plane, substantially reject ambient light and condition ingress light directed to a plurality of photo-detectors.

6. The apparatus of claim 5, wherein the filter is characterized by at least one of being configured to effect beam forming, being wavelength sensitive, being anti-reflective, including a quarter-wave plate, and a coating on the at least one surface of the lens assembly.

7. The apparatus of claim 1, wherein the plurality of light transmission devices is manufactured on the first substrate.

8. The apparatus of claim 7 wherein the second substrate includes a plurality of photo-detectors, and wherein the first substrate is suitable for light transmission device manufacturing.

9. The apparatus of claim 8, wherein the plurality of light transmission devices and the plurality of photo-detectors are arranged as a plurality of device groups, wherein each of the plurality of device groups includes at least one of each of the plurality of light transmission devices and the plurality of photo-detectors.

10. The apparatus of claim 8, wherein some of the plurality of light transmission devices and some of the plurality of photo-detectors are substantially uniformly arranged in the planar array forming at least one of a hexagonal ring arrangement, a fractal pattern, and a grid pattern.

11. The apparatus of claim 7, wherein the first substrate is a silicon-based substrate, and the plurality of light transmission devices are bonded to the silicon-based substrate.

12. The apparatus of claim 7, further comprising planar optics arranged between the lens assembly and the plurality of light transmission devices, wherein the planar optics are configured to provide at least one of egress light beam geometry shaping and beam correction.

13. The apparatus of claim 1, wherein the plurality of optical communication devices comprises a plurality of photo-detectors, wherein each of the plurality of photo-detectors is controllable to receive modulated ingress light including reception data from a corresponding optical communication link.

14. The apparatus of claim 1, further comprising a control module coupled to the plurality of optical communication devices, wherein the control module configured to manage and provide an external interface for the plurality of optical communication link endpoints, and includes at least one of a processor, digital logic, programmable firmware, and an allocation of memory.

15. The apparatus of claim 14, wherein the control module is configured to provide at least one of protocol processing, modulation, demodulation, data buffering, power control, routing, switching, clock recovery, amplification, decoding, and error control.

16. The apparatus of claim 14 further comprising a first substrate including at least a portion of the control module and at least a portion of the plurality of optical communication devices.

* * * * *